United States Patent [19]

Fujitani

[11] 4,238,155
[45] Dec. 9, 1980

[54] METHOD AND APPARATUS TO ENLARGE PHOTOGRAPH

[76] Inventor: Shinkichi Fujitani, No. 10, 315-gaiku, Takamoridai 52-1044, Shona-cho, Kasugai, Aichi Prefecture, Japan

[21] Appl. No.: 54,909

[22] Filed: Jul. 5, 1979

[30] Foreign Application Priority Data

Jul. 8, 1978 [JP] Japan .................................. 53-83427

[51] Int. Cl.³ .......................................... G03B 27/48
[52] U.S. Cl. ..................................................... 355/50
[58] Field of Search ....................... 355/32, 18, 50, 52, 355/55, 77

[56] References Cited

U.S. PATENT DOCUMENTS

| | | | |
|---|---|---|---|
| 1,138,963 | 5/1915 | Leash et al. | 355/50 |
| 1,372,936 | 3/1921 | Clark | 355/52 |
| 3,369,449 | 2/1968 | Klauss et al. | 355/18 |

FOREIGN PATENT DOCUMENTS 573643  3/1924  France ........................................ 355/50

*Primary Examiner*—Donald A. Griffin
*Attorney, Agent, or Firm*—Cooper, Dunham, Clark, Griffin & Moran

[57] ABSTRACT

An image strip on a long film can be efficiently magnified and printed on a long photosensitive material by making run a film in the direction falling at right angles with optical axis at the light source side, making run a photosensitive material in a contrary direction to the direction in which the film is running at the exposuring side, and exposuring the photosensitive material by the light passing through a slit which is set near by the surface of the photosensitive material and the longitudinal axis of the slit falls at right angles with the direction in which the photosensitive material is running, wherein running speed of the film is equal to a chosen multiple of the running speed of the film.

1 Claim, 2 Drawing Figures

METHOD AND APPARATUS TO ENLARGE PHOTOGRAPH

BACKGROUND OF THE INVENTION

1. Field of the Invention

The invention relates to a method and an apparatus to enlarge a photograph. More particularly, the invention relates to a method and an apparatus to enlarge a photograph strip, by magnifying and printing an image strip on a long film upon a long photosensitive material.

2. Description of the Prior Art

Hitherto various methods have been proposed to obtain an image strip on a film like as a panoramic photograph of which angle of view is 360 degrees, but there has not been proposed any suitable methods and apparatuses to enlarge the obtained image strip on a film, like as a panoramic image, to print upon a long photosensitive paper or a long positive film.

SUMMARY OF THE INVENTION

An object of the present invention is to provide a novel method and an apparatus to enlarge a photograph strip, by magnifying and printing efficiently an image strip on a long film upon a long photosensitive material.

Another object of the present invention is to provide a novel method and an apparatus to enlarge a photograph strip, to obtain easily a photograph of which magnification enlarged is different in length direction and in width direction.

Briefly, these objects of the present invention can be attained by a method which comprises making run a film in the direction falling at right angles with optical axis at the light source side, making run a photosensitive material in a contrary direction to the direction in which the film is running at the exposuring side, and exposuring the photosensitive material by the light passing through a slit which is set near by the surface of the photosensitive material and the longitudinal axis of the slit falls at right angles with the direction in which the photosensitive material is running, wherein running speed of the film is equal to a chosen multiple of the running speed of the film.

BRIEF DESCRIPTION OF THE DRAWINGS

An embodiment of the invention is illustrated in the accompanying drawings, in which.

DETAILED DESCRIPTION OF THE PREFERRED EMBODIMENTS

Figure 1:
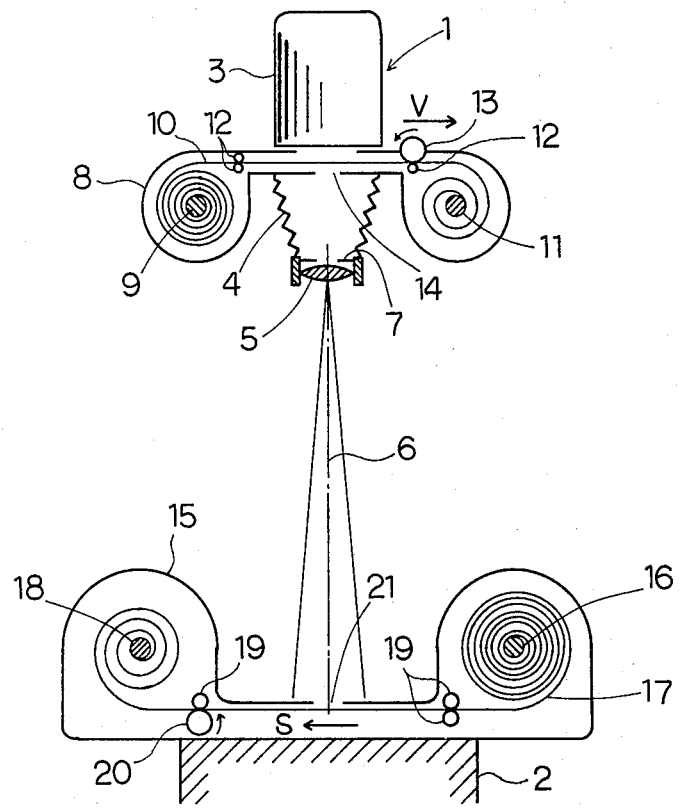
FIG. 1 is a vertical sectional view of an apparatus to enlarge in accordance with the invention.

Referring to the drawings, particularly to FIG. 1, a main body portion of an apparatus to enlarge is generally designated by the numeral 1, which is mounted movably to up and down directions to a base 2 by being hold by a suitable pole (not shown) etc. The main body portion 1 comprises a light source 3, focus adjusting parts 4, lens to enlarge 5 of which optical axis is designated by the numeral 6, an aperture stop 7, and a film carrier 8 of magazine-like style. A roll film 10 is wound on a loading spool 9 and on a winding spool 11, and rollers 12 and 13 are arranged to keep the roller film to run at the definite position to the definite direction. When the film 10 is a perforated film, suitable claws for perforation may be attached to the roller 13. A slit 14 is cut through the body of the film carrier 8, and the longitudinal axis of the slit 14 falls at right angles to the running direction of the film 10.

On the other hand, a photographic paper carrier 15 is attached to the base 2. A roll paper 17 is wound on a loading spool 16 and on a winding spool 18, and rollers 19 and 20 are arranged to keep the paper 17 to run at the definite position to the opposite direction to the running direction of the film 10. A slit 21 is cut through the body of the photographic paper carrier 15, and near by the surface of the paper 17. The longitudinal axis of the slit 21 falls at right angles to the running direction of the paper 17, and the length of the slit is nearly equal to the width of the paper 17. The width of the slit 21 is suitably fixed under the product of the width of the slit 14 by the magnification of the apparatus to enlarge, considering the amount of light from the main body portion 1 as hereinafter described. The width of the slit 21 may be either fixed or variable. It is preferable to provide the loading spools 9 and 16 with brake means to prevent slackening of the film or the paper, and it is also preferable to provide the winding spools 11 and 18 with driving means having a suitable small torque to prevent loosening of the film or the paper.

Figure 2:
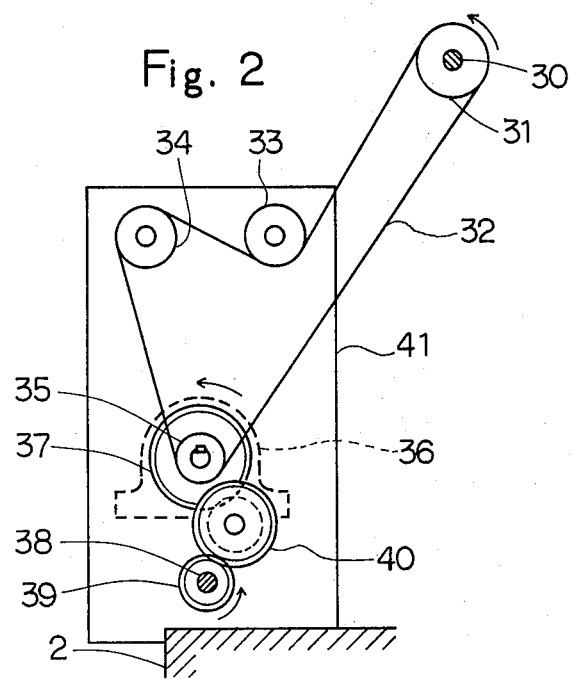
FIG. 2 is a front elevational view of an apparatus to make run rollers of the apparatus to enlarge shown in FIG. 1.

FIG. 2 shows a driving system of the rollers 13 and 20 to make run the film and the paper. A belt pulley 31 is mounted on a roller shaft 30 connected to the roller 13 to make run the film. A belt 32 is wrapped on the belt pulley 30, and the belt 32 is also wrapped on tension pulleys 33 and 34 and a belt pulley 35 mounted on a output shaft of a variable speed motor 36 which is attached to a base plate 41 fixed to the base 2. A gear 39 is mounted on a roller shaft 38 connected to the roller 20 to make run the roll film. A change gear 40, to change the revolving speed ratio of the roller shafts 30 and 38, meshes with the gear 39 and with a gear 37 mounted on the output shaft of the motor 36. The gears 37 and 39, and the belt pulley 35 are located at fixed position on the base plate 41, while the tension pulleys 33 and 34, and the change gear 40 are journaled on shafts of which attached location to the base plate 41 can be changed.

In operation of enlarging by the apparatus having the construction above stated, first of all, the main body portion 1 is moved up and down to adjust the magnification enlarged, while the locations of tension pulleys 33 and 34 are changed to absorb the displacement of the roller shaft 30 so that the same shaft can be driven smoothly, and a selected change gear 40 is set so that the roll paper is driven with the running speed (S) equal to the product of the running speed of the film (V) by the magnification enlarged. After focus adjustment, the motor 36 is driven, and the film 10 and the paper 17 are made to run in opposite direction with the definite running speeds V and S respectively. Because the moving speed of the projected image on the photosensitive emulsion layer of the paper 17 derived from the image on the film 10 is equal to the running speed of the paper (S), a continuous image is continuously printed without blur on the paper 17 by the light passing the slit 21 in accordance with the continuous image on the film, and consequently a seamless photograph strip is obtained. On the above mentioned operation, exposure depends on opening degree of the aperture stop 7 and the exposure time of the paper. The exposure time is equal to the time that one point on the paper requires for passing the width of the slit 21, and is shown by the following relation:

$$\text{Exposure Time} = \frac{\text{Width of the Slit 21}}{\text{Running Speed of the Paper}}$$

Adjustment of the running speed of the paper can be attained by adjusting the revolving speed of the motor 36, and the running speed of the film is changed under the constant film to paper running speed ratio. So exposure can be widely adjusted by adjusting the revolving speed of the motor 36 and adjusting or selecting the width of the slit 21, and the aperture stop 7 may be omitted in some cases. In case that a constant speed type motor is adopted as the motor 36, adjustment of exposure can be attained by only adjusting the aperture stop 7 and/or the width of the slit 21.

For example, on enlarging a 6 cm wide color negative film with 5 times magnification enlarged using the above stated apparatus of which light source is 250 W halogen lamp, a sharp and long size enlarged print is obtained, by setting the aperture stop to F number 8 (F8), the width of slit to 5 mm, the running speed of the film (V) to 1 mm/sec, and the running speed of the paper (S) to 5 mm/sec.

As above mentioned, in case that the running speed of the paper 17 is set equal to the product of the running speed of the film by the magnification enlarged, an image strip on the film is printed on the paper 17 being extended in the same magnification either in length direction or in breadth direction, that is with the same aspect ratio as the image on the film. But by the above stated apparatus, if the width of the slit 21 is reduced, a photograph having different magnification in length and breadth direction, having different aspect ratio from that of image on a film, can be easily obtained by making run the paper 17 with a speed different to the product (shown as S hereinafter) of the running speed of the film by the magnification enlarged. For example, to get an enlarged photograph of which over-extend ratio of length direction is 1.2 being 20% over-extended in length direction, the running speed of the paper is only to be set to 1.2 times of S. And to get an enlarged photograph of which over-extended ratio in length direction is 0.8 being 20% under-extended in length direction, the running speed of the paper is only to be set to 0.8 times of S. Thus, to be useful, an enlarged photograph can be obtained that is over or under-extended in length direction with desired over-extended ratio. In this case, the width of the slit 21 must be as small as possible to prevent blurring or flowing of the printed image.

As a driving apparatus for rollers above stated, any other power transmitting means than belt or gears may be adopted.

And a long transparency useful for wall ornament etc. can easily be attained, by using a color positive film as the film 10, a wide color positive film instead of the paper 17 in above stated embodiment of the invention.

This invention is applied for enlarging an image strip on a film like as a panoramic photograph, and moreover this invention is applied for enlarging and printing continuously all the image strips on a film obtained by ordinary intermittent exposure. In this case, enlarging is done rapidly, because the paper is exposured during running of paper and film, that is quite different from repetition of exposure during stopping of film intermittently running in a general roll printer.

By this invention, as above illustrated, an image strip on a long film can be efficiently magnified and printed upon a photosensitive material strip, to obtain easily a seamless photograph strip useful for decoration or appreciation. Moreover by this invention, a photograph can be easily obtained of which magnification enlarged is different in length direction and in width direction.

We claim:

1. An apparatus to enlarge photograph comprising a light source, a film carrier, focus adjusting parts, a lens to enlarge, means for adjusting magnification enlarged and a photosensitive material carrier, characterized by a roller equipped in said film carrier to make run a film to definite direction, a roller equipped in said photosensitive material carrier to make run a photosensitive material to the direction opposite to said definite direction, a driving means for making run said rollers including unite driving motor and means to change the revoluting speed ratio of said rollers and for absorbing variation of the center distance of said rollers, and a slit which is set near by the surface of the photosensitive material and on the optical axis of said lens to enlarge and of which longitudinal axis falls at right angles to the running direction of said photosensitive material.

* * * * *